(12) United States Patent
Krueger et al.

(10) Patent No.: US 9,023,919 B2
(45) Date of Patent: May 5, 2015

(54) AQUEOUS BINDER COMPOSITION

(71) Applicant: BASF SE, Ludwigshafen (DE)

(72) Inventors: Christian Krueger, Speyer (DE); Ulrich Schuetze, Worms (DE); Kathrin Michl, Ludwigshafen (DE); Michael Kalbe, Weinheim (DE); Andreas Pfau, Ludwigshafen (DE); Holger Schilling, Birkenau (DE); Christian Brand, Hettenleidelheim (DE); Marcus Seibert, Biblis (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/765,037

(22) Filed: Feb. 12, 2013

(65) Prior Publication Data

US 2013/0210967 A1    Aug. 15, 2013

Related U.S. Application Data

(60) Provisional application No. 61/598,375, filed on Feb. 14, 2012.

(51) Int. Cl.
*C08L 97/00* (2006.01)
*C09J 197/00* (2006.01)
*C08L 33/02* (2006.01)

(52) U.S. Cl.
CPC ........... *C08L 97/005* (2013.01); *C09J 197/005* (2013.01); *C08L 33/02* (2013.01)

(58) Field of Classification Search
USPC ...................................... 524/72, 73
See application file for complete search history.

(56) References Cited

U.S. PATENT DOCUMENTS

| | | | |
|---|---|---|---|
| 2,520,959 A | 9/1950 | Powers et al. | |
| 3,238,173 A | 3/1966 | Bailey et al. | |
| 3,360,599 A | 12/1967 | Nyberg et al. | |
| 3,397,165 A | 8/1968 | Goodman et al. | |
| 3,726,824 A | 4/1973 | Saunders et al. | |
| 3,734,686 A | 5/1973 | Douglas et al. | |
| 4,076,917 A | 2/1978 | Swift et al. | |
| 4,269,749 A | 5/1981 | Marriott et al. | |
| 5,143,582 A | 9/1992 | Arkens et al. | |
| 6,207,756 B1 | 3/2001 | Datta et al. | |
| 2004/0082689 A1 | 4/2004 | Taylor et al. | |
| 2009/0156080 A1* | 6/2009 | Finch et al. | 442/417 |
| 2009/0169867 A1 | 7/2009 | Kelly | |
| 2009/0170978 A1* | 7/2009 | Kelly | 524/9 |
| 2010/0278890 A1* | 11/2010 | Winowiski | 424/409 |
| 2011/0159768 A1 | 6/2011 | Crescimanno et al. | |

FOREIGN PATENT DOCUMENTS

| | | |
|---|---|---|
| DE | 2 214 450 | 10/1972 |
| DE | 40 03 422 A1 | 8/1991 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 445 578 A2 | 9/1991 |
| EP | 0 583 086 A1 | 2/1994 |
| EP | 0 651 088 A1 | 5/1995 |
| EP | 0 672 920 A1 | 9/1995 |
| EP | 0 771 328 | 5/1997 |
| EP | 2 199 320 A1 | 6/2010 |
| WO | WO 95/33775 A1 | 12/1995 |
| WO | WO 99/09100 A1 | 2/1999 |
| WO | WO 2008/150647 A1 | 12/2008 |
| WO | WO 2010/034645 A1 | 4/2010 |

OTHER PUBLICATIONS

International Search Report and Written Opinion issued Jun. 3, 2013, in PCT/EP2013/052380.

* cited by examiner

*Primary Examiner* — Liam J Heincer
*Assistant Examiner* — Nicholas Hill
(74) *Attorney, Agent, or Firm* — Oblon, McClelland, Maier & Neustadt, L.L.P.

(57) ABSTRACT

Aqueous binder composition for granular and/or fibrous substrates, where the binder contains i) a copolymer constructed from ethylenically unsaturated monomers; and ii) lignin.

17 Claims, No Drawings

AQUEOUS BINDER COMPOSITION

The present invention provides an aqueous binder composition comprising as essential binder components
a) at least one polymer P constructed from
   ≥0.1 and ≤10 wt % of at least one monoethylenically unsaturated compound having at least one silicon-containing group, an epoxy, hydroxyalkyl, N-methylol or carbonyl group, and/or of at least one compound which has at least two nonconjugated ethylenically unsaturated groups (monomers A)
   ≥0 and <5 wt % of at least one monoethylenically unsaturated $C_3$ to $C_6$ monocarboxylic and/or $C_4$-$C_6$-dicarboxylic acid and also the salts and anhydrides thereof (monomers B), and
   >85 and ≤99.9 wt % of further ethylenically unsaturated compounds, different from the monomers A and B, the nature and amount of these ethylenically unsaturated compounds being selected such that a polymer constructed solely from them in polymerized form would have a glass transition temperature in the range ≥10 and ≤50° C. (monomers C), in polymerized form, wherein the amounts of monomers A to C sum to 100 wt %, and
b) at least one lignin compound L, the amount of which is determined such that it is ≥10 and ≤60 parts by weight per 100 parts by weight of polymer P.

The invention further embraces the use of the aqueous binder composition as binder for granular and/or fibrous substrates, a process for producing a shaped article from granular and/or fibrous substrates, using the aqueous binder composition, and also the use of the resultant shaped articles for producing bituminized roofing membranes.

The consolidation of fibrous and/or granular substrates, especially in sheetlike structures, exemplified by fiber webs, fiber boards or chipboard panels or by more complex non-sheetlike moldings, etc., is frequently accomplished chemically using a polymeric binder. To increase the strength, especially the breaking strength, and also the heat resistance, binders are in many cases used that comprise crosslinkers which give off formaldehyde. As a consequence of this, however, there is a risk of unwanted formaldehyde emission.

For the purpose of avoiding formaldehyde emissions there have already been numerous alternatives proposed to the existing binders. For instance, U.S. Pat. No. 4,076,917 discloses binders which comprise carboxylic acid-containing or carboxylic anhydride-containing polymers and β-hydroxyalkylamides as crosslinkers. A disadvantage is the relatively costly and inconvenient preparation of the β-hydroxyalkylamides.

EP-A-445578 discloses boards made of finely divided materials, such as glass fibers, for example, in which mixtures of high molecular weight polycarboxylic acids and polyhydric alcohols, alkanolamines or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also, optionally, anhydride groups, and a polyol. These binders require a phosphorus-containing reaction accelerator in order to attain sufficient strengths on the part of the glass fiber webs. It is noted that the presence of such a reaction accelerator is vital unless a reactive polyol is used. Highly reactive polyols specified include β-hydroxyalkylamides.

EP-A 651088 describes corresponding binders for substrates made from cellulosic fiber. These binders mandatorily comprise a phosphorus-containing reaction accelerator.

EP-A 672920 describes formaldehyde-free binding, impregnating or coating compositions which comprise at least one polyol and a polymer which is composed to an extent of 2% to 100% by weight of an ethylenically unsaturated acid or acid anhydride as comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are only low.

DE-A 2214450 describes a copolymer composed of 80% to 99% by weight of ethylene and 1% to 20% by weight of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

US-A 2004/82689 discloses formaldehyde-free aqueous binders for producing fiber webs, more particularly glass fiber webs, said binders consisting essentially of a polymeric polycarboxylic acid, a polyol and an imidazoline derivative. The bonded fiber webs obtained are said to exhibit reduced water absorption. Both nitrogen-containing and nitrogen-free polyols are disclosed nonspecifically, although the nitrogen-containing triethanolamine in particular is described as preferred. Specific imidazoline derivatives mentioned include reaction products of a fatty acid with aminoethylethanolamine or diethylenetriamine. The aqueous binder compositions disclosed contain a phosphorus-containing reaction accelerator.

WO 99/09100 discloses thermally curable compositions comprising, in addition to an alkanolamine having at least two OH groups, a polymer 1 and a further polymer 2 comprising respectively ≤5 wt % and ≥15 wt % of an α,β-ethylenically unsaturated mono- or dicarboxylic acid in polymerized form, and the use of said compositions as formaldehyde-free binders in the manufacture of shaped articles.

Furthermore WO10/34645 discloses aqueous binder systems for granular and/or fibrous substrates, comprising as active constituents a polymer 1, comprising ≥5.5 wt % and ≤20 wt % of an α,β-ethylenically unsaturated mono- or dicarboxylic acid in polymerized form, a polymer 2, comprising ≥40 wt % of an α,β-ethylenically unsaturated mono- or dicarboxylic acid in polymerized form, and a polyol compound having at least two hydroxyl groups.

A priority-founding European patent application numbered 11154347.6, unpublished at the filing date of the present invention, discloses, for granular and/or fibrous substrates, aqueous binders which, in addition to a carboxyl-containing polymer and a polyol compound, comprise essentially a salt compound. These salt-containing binder liquors have an advantageous effect on wet breaking strength and also 180° C. breaking strength of fiber webs bonded therewith.

Likewise in a priority-founding European patent application numbered 11159420.6 and unpublished at the priority date of the present invention, aqueous binders for fibrous and/or granular substrates are disclosed that comprise as essential components a polymeric polycarboxylic acid, a nitrogen-free polyol compound having at least two hydroxyl groups, and a hydroxyl-free organic nitrogen compound having a pKB ≤7.

The prior art starting point for lignin-containing binder systems is set out below.

Thus US-A 2009/170978 discloses binder systems based on a mixture of polysaccharides, plant proteins or lignin derivatives with an emulsion polymer that comprises in polymerized form 5 to 40 wt % of an ethylenically unsaturated carboxylic acid. The polysaccharides and plant proteins are used advantageously in the form of undissolved particulate systems. No further details are given concerning the use of lignin derivatives.

US-A 2011/159768 discloses aqueous binder systems which comprise polymers containing oxazoline groups and lignin derivatives grafted with ethylenically unsaturated carboxylic acids. In contrast, EP-A 2199320 discloses binder systems based on emulsion polymers and defatted soy flour and also the use thereof for producing composite materials. In one specific embodiment the binders may further comprise lignin and/or ligninsulfonate as well.

Yet the shaped articles, more particularly fiber webs, produced with the aforementioned compositions are not always able to provide full satisfaction in terms of all the mechanical properties, such as the breaking strength and also the heat resistance. Furthermore, the market is increasingly demanding alternative formaldehyde-free and/or reduced-formaldehyde binder systems based on renewable raw materials.

It was an object of the present invention to provide an alternative, formaldehyde-free or reduced-formaldehyde aqueous binder system based on renewable raw materials, for fibrous and/or granular substrates, which in respect of shaped articles, such as fiber webs, for example, produces equivalent or improved mechanical properties, such as more particularly the breaking strength and also the heat resistance.

The aqueous binder defined at the outset has been found accordingly.

As essential binder component, a polymer P is used which is constructed from

≥0.1 and ≤10 wt % of at least one monoethylenically unsaturated compound having at least one silicon-containing group, an epoxy, hydroxyalkyl, N-methylol or carbonyl group, and/or of at least one compound which has at least two nonconjugated ethylenically unsaturated groups (monomers A)

≥0 and <5 wt % of at least one monoethylenically unsaturated $C_3$ to $C_6$ monocarboxylic and/or $C_4$-$C_6$-dicarboxylic acid and also the salts and anhydrides thereof (monomers B), and >85 and ≤99.9 wt % of further ethylenically unsaturated compounds, different from the monomers A and B, the nature and amount of these ethylenically unsaturated compounds being selected such that a polymer constructed solely from them in polymerized form would have a glass transition temperature in the range ≥10 and ≤50° C. (monomers C), in polymerized form, wherein the amounts of monomers A to C sum to 100 wt %.

Monomers A contemplated include all monoethylenically unsaturated compounds which have at least one silicon-containing group. With particular advantage the monomers A have a hydrolyzable silicon-containing group. Hydrolyzable, silicon-containing groups advantageously contain at least one alkoxy group or a halogen atom, such as chlorine, for example. Monomers A that can be used with advantage in accordance with the invention are disclosed in WO 2008/150647, page 9, lines 5 to 25. By virtue of their express referencing, these silicon-group-containing monomers A are considered part of the present description. With particular advantage, however, the silicon-group-containing monomer A is selected from the group encompassing vinyltriacetoxysilane, 3-methacryloyloxypropyltrimethylsilane and vinyltriethoxysilane.

Further contemplated as monomers A are all monoethylenically unsaturated compounds which have at least one epoxy group, such as, for example, vinyloxirane, allyloxirane, glycidyl acrylate and/or glycidyl methacrylate, with glycidyl acrylate and/or glycidyl methacrylate being particularly preferred.

As monomers A it is possible additionally to use all hydroxyalkyl, advantageously hydroxy-$C_2$-$C_{10}$ alkyl, preferably hydroxy-$C_2$-$C_4$ alkyl and more advantageously hydroxy-$C_2$-$C_3$ alkyl acrylates and/or methacrylates, and in the context of this specification the alkoxylated hydroxyalkyl acrylates and/or methacrylates, i.e., those reacted with alkylene oxides (essentially ethylene oxide and propylene oxide), are also considered to be monomers A. The hydroxyalkyl-containing monomer A is advantageously selected from the group encompassing diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate and 2-hydroxyethyl methacrylate. Particular advantage attaches to using 2-hydroxyethyl acrylate and/or 2-hydroxyethyl methacrylate, with 2-hydroxyethyl acrylate being particularly preferred.

Further contemplated as monomers A are all monoethylenically unsaturated compounds which have at least one N-methylol group, such as, for example, N-methylolamide compounds based on α,β-monoethylenically unsaturated $C_3$ to $C_6$ monocarboxamides or dicarboxamides, such as more particularly N-methylolacrylamide and N-methylolmethacrylamide.

As monomers A it is also possible to use all monoethylenically unsaturated compounds which have at least one carbonyl group, such as, for example, vinylcarbonyl compounds, such as, for example, phenyl vinyl ketone, or dicarbonyl compounds, such as more particularly diacetoneacrylamide and also acetylacetoxyethyl acrylate and acetylacetoxyethyl methacrylate.

The monomers A further include compounds which have at least two nonconjugated ethylenically unsaturated groups, such as vinyl, vinylidene or alkenyl groups. Particularly advantageous in this context are the diesters of dihydric alcohols with α,β-monoethylenically unsaturated monocarboxylic acids, among which acrylic acid and methacrylic acid are preferred. Examples of monomers of this kind containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with α,β-monoethylenically unsaturated monocarboxylic acids, such as, for example, glyceryl triacrylate, glyceryl trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Especially preferred are 1,4-butylene glycol diacrylate, allyl methacrylate and/or divinylbenzene, with divinylbenzene for the purposes of this specification embracing 1,2-divinylbenzene, 1,3-divinylbenzene and/or 1,4-divinylbenzene.

With particular advantage the at least one monomer A is selected from the group encompassing N-methylolacrylamide, N-methylolmethacrylamide, glycidyl acrylate, glycidyl methacrylate, 2-hydroxyethyl acrylate, 2-hydroxyethyl methacrylate, 1,4-butylene glycol diacrylate, allyl methacrylate and/or divinylbenzene.

The polymer P comprises the at least one monomer A in an amount of ≥0.1 and ≤10 wt %, preferably ≥0.1 and ≤5 wt % and with more particular preference ≥0.5 and ≤3 wt % in polymerized form.

Monomers B used include all monoethylenically unsaturated $C_3$ to $C_6$ monocarboxylic and/or $C_4$-$C_6$ dicarboxylic acids, such as, for example, acrylic acid, methacrylic acid, ethylacrylic acid, itaconic acid, allylacetic acid, crotonic acid, vinylacetic acid, fumaric acid, maleic acid or 2-methylmaleic acid. However, the monomers B also include the anhydrides of corresponding α,β-monoethylenically unsaturated dicarboxylic acids, such as, for example, maleic anhydride or 2-methylmaleic anhydride. Monomer B is preferably selected from the group encompassing acrylic acid, methacrylic acid, crotonic acid, fumaric acid, maleic acid, maleic anhydride, 2-methylmaleic acid and itaconic acid, with acrylic acid, methacrylic acid, maleic acid, maleic anhydride and/or itaconic acid being particularly preferred. Self-evidently the monomers B also include the fully or partially neutralized water-soluble salts, more particularly the alkali metal salts or ammonium salts, of the aforementioned acids.

The polymer P comprises the at least one monomer B in an amount of ≥0 and <5 wt % and preferably ≥0.1 and ≤4 wt % and with particular preference ≥0.1 and ≤3 wt % in polymerized form.

As monomers C it is possible to use all ethylenically unsaturated compounds differing from the monomers A and B, although the nature and amount of the monomers C are selected such that a polymer constructed from these ethylenically unsaturated compounds alone in polymerized form would have a glass transition temperature in the range ≥10 and ≤50° C.

Examples of suitable monomers C include conjugated aliphatic $C_4$ to $C_9$ diene compounds, esters of vinyl alcohol and a $C_1$ to $C_{10}$ monocarboxylic acid, $C_1$ to $C_{10}$ alkyl acrylates, $C_5$ to $C_{10}$ alkyl methacrylates, $C_5$ to $C_{10}$ cycloalkyl acrylates and methacrylates, $C_1$ to $C_{10}$ dialkyl maleates, $C_1$ to $C_{10}$ dialkyl fumarates, vinyl ethers of $C_3$ to $C_{10}$ alkanols, branched and nonbranched $C_3$ to $C_{10}$ olefins, such as more particularly vinyl acetate, ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, di-n-butyl maleate, di-n-butyl fumarate or tert-butyl vinyl ether used, with 2-ethylhexyl acrylate, n-butyl acrylate, 1-4-butadiene and/or ethyl acrylate being especially preferred.

But the monomers C also include vinylaromatic monomers, $C_1$ to $C_4$ alkyl methacrylates and ethylenically unsaturated nitrile compounds. By vinylaromatic monomers are meant in particular derivatives of styrene or of α-methylstyrene in which the phenyl nuclei are substituted optionally by 1, 2 or 3 $C_1$ to $C_4$ alkyl groups, halogen, more particularly bromine or chlorine, and/or methoxy groups, examples being styrene, α-methylstyrene, o- or p-vinyltoluene, p-acetoxystyrene, p-bromostyrene, p-tert-butylstyrene, o-, m- or p-chlorostyrene. The ethylenically unsaturated nitrile compounds are substantially $C_3$ to $C_6$, preferably $C_3$ or $C_4$ monocarbonitriles or $C_4$ to $C_6$ dicarbonitriles, examples being acrylonitrile, methacrylonitrile, maleonitrile and/or fumaronitrile, with acrylonitrile and/or methacrylonitrile being particularly preferred. Examples of $C_1$ to $C_4$ alkyl methacrylates include methyl methacrylate, tert-butyl acrylate, tert-butyl methacrylate, ethyl methacrylate or isobutyl methacrylate.

The monomers C are advantageously selected from the group encompassing conjugated aliphatic $C_4$ to $C_9$ dienes, esters of vinyl alcohol and a $C_1$ to $C_{10}$ monocarboxylic acid, $C_1$ to $C_{10}$ alkyl acrylates, $C_1$ to $C_{10}$ alkyl methacrylates, ethylenically unsaturated $C_3$ to $C_6$ monocarbonitriles, ethylenically unsaturated $C_4$ to $C_6$ dicarbonitriles, $C_5$ to $C_{10}$ cycloalkyl acrylates and methacrylates, $C_1$ to $C_{10}$ dialkyl maleates and $C_1$ to $C_{10}$ dialkyl fumarates and vinylaromatic monomers.

With particular advantage the monomers C are selected from the group encompassing 2-ethylhexyl acrylate, n-butyl acrylate, acrylonitrile, 1,4-butadiene, ethyl acrylate, vinyl acetate, methyl methacrylate, styrene and tert-butylstyrene.

It is of essential significance that the monomers C are selected in terms of their nature and amount such that a polymer constructed from these ethylenically unsaturated monomers alone in polymerized form would have a glass transition temperature in the range ≥10 and ≤50° C. and preferably ≥25 and ≤40° C.

For the purposes of this specification, the glass transition temperature, Tg, is the limiting value of the glass transition temperature toward which this parameter tends with increasing molecular weight, according to G. Kanig (Kolloid-Zeitschrift & Zeitschrift für Polymere, volume 190, page 1, equation 1). For the purposes of this specification, the Tg is determined by the DSC method (differential scanning calorimetry, 20 K/min, midpoint measurement, DIN 53 765). The Tg values for the homopolymers of the majority of monomers are known and are set out for example in Ullmann's Ecyclopedia of Industrial Chemistry, VCH Weinheim, 1992, volume 5, vol. A21, p. 169; further sources of glass transition temperatures for homopolymers include for example J. Brandrup, E. H. Immergut, Polymer Handbook, 1st Ed., J. Wiley, New York 1966, 2nd Ed. J. Wiley, New York 1975, and 3rd Ed. J. Wiley, New York 1989).

It is essential, however, that the glass transition temperatures of noncrosslinked or only slightly crosslinked polymers, according to Fox (T. G. Fox, Bull. Am. Phys. Soc. 1956 [Ser. II] 1, page 123 and in accordance with Ullmann's Encyclopädie der technischen Chemie, volume 19, page 18, 4th edition, Verlag Chemie, Weinheim, 1980) is given in good approximation by the following equation:

$$1/Tg = x1/Tg1 + x2/Tg2 + \ldots xn/Tgn,$$

where x1, x2, . . . xn are the mass fractions of the monomers 1, 2, . . . n and Tg1, Tg2, . . . Tgn are the glass transition temperatures in degrees Kelvin of the polymers each constructed of just one of the monomers 1, 2, . . . n.

In accordance with the invention the polymer P contains >85 ands ≤99.9 wt %, preferably ≥91 and ≤99.8 wt % and with more particular preference ≥94 and ≤99.4 wt % of monomers C in polymerized form.

$C_1$ to $C_{10}$ alkyl groups for the purposes of this specification are linear or branched alkyl radicals having 1 to 10 carbon atoms, examples being methyl, ethyl, n-propyl, isopropyl, n-butyl, sec-butyl, isobutyl, tert-butyl, n-pentyl, isopentyl, tert-pentyl n-hexyl, 2-ethylhexyl, n-nonyl or n-decyl. $C_5$ to $C_{10}$ cycloalkyl groups are preferably cyclopentyl or cyclohexyl groups, which may optionally be substituted by 1, 2 or 3 $C_1$ to $C_4$ alkyl groups.

It is advantageous to use a polymer P containing

| | |
|---|---|
| ≥0.1 and ≤5 wt % | of monomers A, |
| ≥0.1 and ≤4 wt % | of monomers B, and |
| ≥91 and ≤99.8 wt % | of monomers C | and also with particular advantage

| | |
|---|---|
| ≥0.5 and ≤3 wt % | of monomers A, |
| ≥0.1 and ≤3 wt % | of monomers B, and |
| ≥94 and ≤99.4 wt % | of monomers C | in polymerized form.

With particular advantage the polymer P is constructed in polymerized form from
≥0.5 and ≤3 wt % of N-methylolacrylamide, N-methylolmethacrylamide, glycidyl acrylate, glycidyl methacrylate, 2-hydroxyethyl acrylate, 2-hydroxyethyl methacrylate, 1,4-butylene glycol diacrylate, allyl methacrylate and/or divinylbenzene
≥0.1 and ≤3 wt % of acrylic acid, methacrylic acid, maleic acid, maleic anhydride and/or itaconic acid
≥94 and ≤99.4 wt % of 2-ethylhexyl acrylate, n-butyl acrylate, acrylonitrile, 1,4-butadiene, ethyl acrylate, vinyl acetate, methyl methacrylate, styrene and/or tert-butyl methacrylate.

It is important that in the context of this specification the fraction of the monomers A to C that are present in polymerized form in the polymer P is to correspond to the proportions of the monomers A to C that are used for preparing the polymer P.

The polymers P of the present invention may in principle have glass transition temperatures Tg in the range of ≥10 and ≤100° C. and also advantageously ≥15 and ≤70° C. and especially advantageously ≥25 and ≤50° C.

The preparation of polymers P will in principle be familiar to a person skilled in the art and is effected for example through free-radical polymerization of monomers A to C by the method of substance, emulsion, solution, precipitation or suspension polymerization, although free-radically initiated aqueous emulsion polymerization is particularly preferred. It is therefore advantageous according to the present invention for the polymer P to be dispersed in an aqueous medium, i.e., used in the form of an aqueous polymer dispersion.

The performance of free-radically initiated emulsion polymerizations of ethylenically unsaturated monomers in an aqueous medium has been extensively described and therefore is sufficiently familiar to a person skilled in the art [cf. Emulsion polymerization in Encyclopedia of Polymer Science and Engineering, Vol. 8, pages 659 ff (1987); D. C. Blackley, in High Polymer Latices, Vol. 1, pages 35 ff. (1966); H. Warson, The Applications of Synthetic Resin Emulsions, chapter 5, pages 246 it (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. The free-radically initiated aqueous emulsion polymerization is typically carried out by the ethylenically unsaturated monomers being dispersed in an aqueous medium, generally by co-use of dispersing assistants, such as emulsifiers and/or protective colloids, and polymerized using at least one water-soluble free-radical polymerization initiator. Frequently, in the aqueous polymer dispersions obtained, the residual contents of unconverted ethylenically unsaturated monomers are reduced by chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by thinning or concentrating, or the aqueous polymer dispersion is mixed with further customary addition agents, for example bactericidal, foam- or viscosity-modifying additives. From this general procedure, the production of an aqueous dispersion of polymer P merely differs by the specific use of the aforementioned monomers A to C. It will be appreciated in this connection that producing polymer P herein shall also comprise the seed, staged and gradient modes of operation which are familiar to a person skilled in the art.

The polymers P used according to the present invention are preparable in the form of their aqueous polymer dispersion (aqueous polymer P dispersion) by initially charging the overall amount of monomers A to C (total monomer quantity) in the aqueous reaction medium before initiating the polymerization reaction. However, it is also possible to optionally merely initially charge a portion of monomers A to C in the aqueous reaction medium before initiating the polymerization reaction and then, after initiating the polymerization, to add the overall amount or, as may be, the remaining quantity under polymerization conditions during the free-radical emulsion polymerization at the rate of consumption, continuously with constant or varying flow rates, or discontinuously. The monomers A to C can be dosed as separate individual streams, as homogeneous or inhomogeneous (partial) mixtures, or as monomer emulsion. Advantageously, the monomers A to C are dosed in the form of a monomer mixture and more particularly in the form of an aqueous monomer emulsion.

The aqueous polymer P dispersion used according to the present invention is prepared by co-using dispersing assistants which keep both the monomer droplets and the produced polymer particles in a state of dispersion in the aqueous medium and so ensure the stability of the aqueous polymer dispersion produced. As dispersing assistants there come into consideration the protective colloids typically used for performance of free-radical aqueous emulsion polymerizations as well as emulsifiers.

Suitable protective colloids are for example polyvinyl alcohols, polyalkylene glycols, alkali metal salts of polyacrylic acids and polymethacrylic acids, gelatin derivatives or acrylic acid, meth-acrylic acid, maleic anhydride, 2-acrylamido-2-methylpropanesulfonic acid and/or 4-styrenesulfonic acid-containing copolymers and their alkali metal salts but also homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. An extensive description of further suitable protective colloids is given in Houben-Weyl, Methoden der organischen Chemie, volume XIV/1, Makromolekulare Stoffe, Georg-Thieme-Verlag, Stuttgart, 1961, pages 411 to 420.

It will be appreciated that mixtures of protective colloids and/or emulsifiers can also be used. Frequently, the dispersing agents used are exclusively emulsifiers whose relative molecular weights are typically below 1000, unlike protective colloids. They can be anionic, cationic or nonionic in nature.

It will be appreciated that, when the mixtures of surface-active substances are used, the individual components have to be compatible with each or one another, which in the case of doubt can be verified in a few preliminary tests. In general, anionic emulsifiers are compatible with other anionic emulsifiers and with nonionic emulsifiers. The same also applies to cationic emulsifiers, while anionic and cationic emulsifiers are usually not compatible with one another. An overview of suitable emulsifiers is given in Houben-Weyl, Methoden der organischen Chemie, volume XIV/1, Makromolekulare Stoffe, Georg-Thieme-Verlag, Stuttgart, 1961, pages 192 to 208.

However, especially emulsifiers are used as dispersing assistants.

Customary nonionic emulsifiers are for example ethoxylated mono-, di- and tri-alkylphenols (EO degree: 3 to 50, alkyl radical: $C_4$ to $C_{12}$) and also ethoxylated fatty alcohols (EO degree: 3 to 80, alkyl radical: $C_8$ to $C_{36}$). Examples thereof are the Lutensol® A brands ($C_{12}C_{14}$ fatty alcohol ethoxylates, EO degree: 3 to 8), Lutensol® AO brands ($C_{13}C_{15}$ oxo process alcohol ethoxylates, EO degree: 3 to 30), Lutensol® AT brands ($C_{16}C_{18}$ fatty alcohol ethoxylates, EO degree: 11 to 80), Lutensol® ON brands ($C_{10}$ oxo process alcohol ethoxylates, EO degree: 3 to 11) and the Lutensol® TO brands ($C_{13}$ oxo process alcohol ethoxylates, EO degree: 3 to 20) from BASF SE.

Customary anionic emulsifiers are for example alkali metal and ammonium salts of alkyl sulfates (alkyl radical: $C_8$ to $C_{12}$), of sulfuric monoesters of ethoxylated alkanols (EO degree: 4 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Suitable anionic emulsifiers further include compounds of the general formula (I)

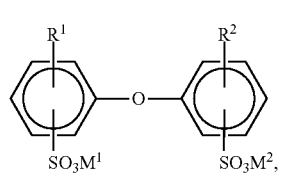

where $R^1$ and $R^2$ are H atoms or $C_4$ to $C_{24}$ alkyl that are not H atoms at the same time, and $M^1$ and $M^2$ can be alkali metal ions and/or ammonium ions. In the general formula (I), $R^1$ and $R^2$ are preferably linear or branched alkyl radicals of 6 to 18 carbon atoms and more particularly of 6, 12 and 16 carbon atoms, or hydrogen, with the proviso that $R^1$ and $R^2$ are not both an H atom at the same time. $M^1$ and $M^2$ are each preferably sodium, potassium or ammonium, of which sodium is particularly preferred. Particularly advantageous are compounds (I) in which $M^1$ and $M^2$ are both sodium, $R^1$ is a branched alkyl radical of 12 carbon atoms and $R^2$ an H atom or $R^1$. Technical grade mixtures are frequently used that include a 50 to 90 wt % fraction of monoalkylated product, for example Dowfax® 2A1 (trademark of Dow Chemical Company). Compounds (I) are common knowledge, for example from U.S. Pat. No. 4,269,749, and commercially available.

Suitable cation-active emulsifiers are generally $C_6$-$C_{18}$-alkyl-, -alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples which may be mentioned are dodecylammonium acetate or the corresponding sulfate, the sulfates or acetates of the various 2-(N,N,N-trimethylammonium)ethyl paraffinic acid esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and also the gemini surfactant N,N-(lauryldimethyl)ethylenediamine disulfate, ethoxylated tallowalkyl N-methylammonium sulfate and ethoxylated oleylamine (for example Uniperol® AC from BASF SE, about 11 ethylene oxide units). Numerous further examples are given in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is beneficial when the anionic counter-groups have very low nucleophilicity, for example perchlorate, sulfate, phosphate, nitrate and carboxylates, for example acetate, trifluoroacetate, trichloroacetate, propionate, oxalate, citrate, benzoate, and also conjugated anions of organosulfonic acids, for example methylsulfonate, trifluoromethylsulfonate and para-toluenesulfonate, further tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers preferred for use as dispersing assistants are advantageously used in an overall amount ≥0.005 and ≤10 wt %, preferably ≥0.01 and ≤5 wt % and more particularly ≥0.1 and ≤3 wt %, all based on the total monomer quantity.

The overall amount of the protective colloids used as dispersing assistants in addition to or in lieu of emulsifiers is often ≥0.1 and ≤40 wt % and frequently ≥0.2 and ≤25 wt %, all based on the total monomer quantity.

Preferably, however, it is anionic and/or nonionic emulsifiers and more preferably anionic emulsifiers that are used as dispersing assistants.

The polymer P dispersion used according to the present invention is preparable by initially charging the overall amount of the dispersing assistant in the aqueous reaction medium before initiating the polymerization reaction. However, it is also possible to optionally merely initially charge a portion of the dispersing assistant in the aqueous reaction medium before initiating the polymerization reaction and then to add the overall amount or as the case may be any remaining quantity of dispersing assistant under polymerization conditions during the free-radical emulsion polymerization, continuously or batchwise. Preferably, the main or overall quantity of dispersing assistant is added in the form of an aqueous monomer emulsion.

The free-radically initiated aqueous emulsion polymerization is triggered using a free-radical polymerization initiator (radical initiator). In principle, not only peroxides but also azo compounds can be concerned here. Redox initiator systems also come into consideration, as will be appreciated. As peroxides there can be used in principle inorganic peroxides, such as hydrogen peroxide or peroxodisulfates, such as the mono- or di-alkali metal or ammonium salts of peroxodisulfuric acid, for example its mono- and di-sodium, potassium or ammonium salts or organic peroxides, such as alkyl hydroperoxides, for example tert-butyl hydroperoxide, p-mentyl hydroperoxide or cumyl hydroperoxide, and also dialkyl or diaryl peroxides, such as di-tert-butyl or dicumyl peroxide. As azo compound it is essentially 2,2'-azobis(isobutyronitrile), 2,2'-azobis(2,4-dimethylvaleronitrile) and 2,2'-azobis(amidinopropyl)dihydrochloride (AIBA, corresponds to V-50 from Wako Chemicals) which are used. As oxidizing agents for redox initiator systems it is essentially the abovementioned peroxides which come into consideration. As corresponding reducing agents there can be used sulfur compounds of low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of multivalent metals, such as iron(II) sulfate, iron(II) ammonium sulfate, iron(II) phosphate, enediols, such as dihydroxymaleic acid, benzoin and/or ascorbic acid and also reducing saccharides, such as sorbose, glucose, fructose and/or dihydroxyacetone. In general, the amount of free-radical initiator used is from 0.01 to 5 wt %, preferably 0.1 to 3 wt % and more preferably 0.2 to 1.5 wt %, based on the total monomer quantity.

The polymer P dispersion used according to the present invention is preparable by initially charging the overall amount of free-radical initiator in the aqueous reaction medium before initiating the polymerization reaction. However, it is also possible to optionally initially charge merely a portion of the free-radical initiator in the aqueous reaction medium before initiating the polymerization reaction and then to add the overall amount or as the case may be any remaining quantity under polymerization conditions during the free-radical emulsion polymerization at the rate of consumption, continuously or discontinuously.

Initiating the polymerization reaction refers to starting the polymerization reaction of the monomers in the polymerization vessel after free-radical formation on the part of the free-radical initiator. The polymerization reaction can be initiated by addition of free-radical initiator to the aqueous polymerization mixture in the polymerization vessel under polymerization conditions. However, it is also possible for the addition of some or all of the free-radical initiator to the aqueous polymerization mixture comprising the initially charged monomers, in the polymerization vessel, to take place under conditions which are not suitable for triggering a polymerization reaction, for example at low temperature, and for polymerization conditions to be established in the aqueous polymerization mixture thereafter. Polymerization conditions are generally those temperatures and pressures under which the free-radically initiated aqueous emulsion polymerization proceeds at a sufficient polymerization rate. They are more particularly dependent on the free-radical initiator used. Advantageously, free-radical initiator type and quantity, the polymerization temperature and the polymerization pressure are selected such that the free-radical initiator has a half-life <3 hours, more advantageously <1 hour and even more advantageously <30 minutes, while sufficient starting free-radicals are available at all times in order that the polymerization reaction may be initiated and maintained.

The entire range from 0 to 170° C. comes into consideration as reaction temperature for the free-radical aqueous emulsion polymerization. Temperatures employed are generally in the range from 50 to 120° C., preferably in the range from 60 to 110° C. and more preferably in the range from 70 to 100° C. The free-radical aqueous emulsion polymerization can be carried out at a pressure below, equal to or above 1 atm [1.013 bar (absolute), atmospheric pressure], so that the polymerization temperature can exceed 100° C. and range up to 170° C. In the presence of monomers A to F having a low boiling point, the emulsion polymerization is preferably performed under elevated pressure. This pressure can assume values of 1.2, 1.5, 2, 5, 10, 15 bar (absolute) or even higher. When the emulsion polymerization is carried out under reduced pressure, pressures of 950 mbar, frequently of 900 mbar and often 850 mbar (absolute) are set. Advantageously, the free-radical aqueous emulsion polymerization is carried out at 1 atm in the absence of oxygen, more particularly under an inert gas, for example under nitrogen or argon.

The aqueous reaction medium can in principle also comprise minor amounts (<5 wt %) of water-soluble organic solvents, for example methanol, ethanol, isopropanol, butanols, pentanols, but also acetone etc. Preferably, however, the process of the present invention is carried out in the absence of such solvents.

In addition to the aforementioned components, chain transfer agents can optionally also be used during the emulsion polymerization to reduce/police the molecular weight of the polymers P obtainable by the polymerization. Here it is essentially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-benzenethiol, meta-methylbenzenethiol or para-methylbenzenethiol, and also all further sulfur compounds described in Polymerhandbook 3rd edition, 1989, J. Brandrup and E. H. Immergut, John Wiley & Sons, section II, pages 133 to 141, but also aliphatic and/or aromatic aldehydes, such as acet-aldehyde, propionaldehyde and/or benzaldehyde, unsaturated fatty acids, such as oleic acid, dienes with nonconjugated double bonds, such as divinylmethane or vinylcyclohexane or hydrocarbons having readily extractable hydrogen atoms, such as toluene for example, which are used. But it is also possible to use mixtures of aforementioned chain transfer agents that are noninterfering.

The total amount of chain transfer agents optionally used during the emulsion polymerization is generally ≤5 wt %, often ≤3 wt % and frequently ≤1 wt %, based on the total monomer quantity.

It is beneficial when all or some of the optional chain transfer agent used is added to the aqueous reaction medium prior to initiating the free-radical polymerization. In addition, all or some of the chain transfer agent can advantageously also be added to the aqueous reaction medium together with the monomers A to F during the polymerization.

It is essential that the free-radically initiated aqueous emulsion polymerization can also be carried out in the presence of a polymer seed, for example in the presence of 0.01 to 3 wt %, frequently of 0.02 to 2 wt % and often of 0.04 to 1.5 wt % of a polymer seed, all based on the total monomer quantity.

A polymer seed is used in particular when the particle size of the polymer particles to be obtained by free-radical aqueous emulsion polymerization is to be set to a specific value (see for example U.S. Pat. No. 2,520,959 and U.S. Pat. No. 3,397,165).

One polymer seed used in particular has polymer seed particles with a narrow particle size distribution and weight average diameter Dw≤100 nm, frequently ≥5 nm to ≤50 nm and often ≥15 nm to ≤35 nm. Weight average particle diameter determination is known to a person skilled in the art and is done via the analytical ultracentrifuge method for example. Weight average particle diameter herein is to be understood as being the weight average Dw50 value determined by the analytical ultracentrifuge method (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

Narrow particle size distribution herein is to be understood as meaning that the ratio of the analytical ultracentrifuge method weight average particle diameters Dw50 and number average particle diameters DN50 [Dw50/DN50] is <2.0, preferably <1.5 and more preferably <1.2 or <1.1.

The polymer seed is typically used in the form of an aqueous polymer dispersion. The aforementioned amount recitations are based on the polymer solids content of the aqueous polymer seed dispersion.

When a polymer seed is used it is advantageous to employ an exogenous polymer seed. Unlike an in situ polymer seed, which is prepared in the reaction vessel before the actual emulsion polymerization is commenced, and which generally has the same monomeric composition as the polymer prepared by the ensuing free-radically initiated aqueous emulsion polymerization, an exogenous polymer seed is a polymer seed which has been prepared in a separate reaction step and whose monomeric composition differs from the polymer prepared by the free-radically initiated aqueous emulsion polymerization, although this means nothing more than that different monomers, or monomer mixtures with a different composition, are used for preparing the exogenous polymer seed and for preparing the aqueous polymer dispersion. Preparing an exogenous polymer seed is familiar to a person skilled in the art and is typically accomplished by the introduction as initial charge to a reaction vessel of a relatively small amount of monomers and also a relatively large amount of emulsifiers, and by the addition at reaction temperature of a sufficient amount of polymerization initiator.

It is preferred in accordance with the present invention to use an exogenous polymer seed having a glass transition temperature ≥50° C., frequently ≥60° C. or ≥70° C. and often ≥80° C. or ≥90° C. A polystyrene or polymethyl methacrylate polymer seed is preferred in particular.

The total amount of exogenous polymer seed can be initially charged to the polymerization vessel. But it is also possible to merely include a portion of the exogenous polymer seed in the initial charge to the polymerization vessel and to add the remainder during the polymerization together with monomers A to C. If necessary, however, the total polymer seed quantity can also be added during the polymerization. Preferably, the total amount of exogenous polymer seed is initially charged to the polymerization vessel before initiating the polymerization reaction.

The aqueous polymer P dispersions obtainable by emulsion polymerization typically have a polymer solids content of ≥10 and ≤70 wt %, frequently ≥20 and ≤65 wt % and often ≥25 and ≤60 wt %, all based on the aqueous polymer dispersion. The number average particle diameter as determined by quasi-elastic light scattering (ISO standard 13 321) (cumulant z-average) is generally in the range ≥10 and ≤2000 nm, frequently in the range ≥10 and ≤700 nm and often in the range ≥50 to ≤250 nm.

It will be appreciated that aqueous polymer P dispersions are also obtainable in principle in the form of so-called secondary polymer dispersions (concerning in-principle preparation of secondary polymer dispersions see for example Eckersley et al., Am. Chem. Soc., Div. Polymer Chemistry, 1977, 38(2), pages 630, 631, U.S. Pat. Nos. 3,360,599, 3,238, 173, 3,726,824, 3,734,686 or 6,207,756). Secondary aqueous polymer P dispersions are generally obtained when polymers P obtained by the method of substance or solution polymerization are dissolved in a suitable organic solvent and dispersed in an aqueous medium to form aqueous polymer/solvent (mini)emulsions. Subsequent solvent removal yields the corresponding aqueous polymer P dispersions.

Accordingly, the aqueous binder compositions of the present invention comprise aqueous dispersions of polymers P whose number average particle diameter is in the range ≥10 and ≤2000 nm, advantageously in the range ≥10 and ≤700 nm and more advantageously in the range ≥50 to ≤250 nm.

At least one lignin compound L is an essential constituent of the aqueous binder composition as well as the at least one polymer P.

Lignins are understood by a person skilled in the art to be a group of phenolic macromolecules constructed from different monomer units, such as more particularly p-coumaryl alcohol, coniferyl alcohol and sinapyl alcohol, joined to one another essentially via ether groups. The lignins are solid biopolymers which are incorporated in the cell walls of plants and thereby result in lignification of a cell. Since lignin in nature is effected via an enzymatic radical reaction, the composition and the proportions of the individual units are highly variable and there is no directed linking in accordance with a consistent scheme. It is also important that the lignin of different woods and different plant species differs in the percentage fractions of the aforementioned principal components. Thus the lignin from coniferous wood comprises predominantly coniferyl units, which have a guaiacyl radical (3-methoxy-4-hydroxyphenyl radical). In contrast, the lignin from deciduous wood comprises varying proportions of guaiacyl radicals and sinapyl units, which contain a syringyl radical (3,5-methoxy-4-hydroxyphenyl radical).

In paper and pulp production it is necessary to dissolve the disruptive lignin from the lignocellulose and remove it from the operation of paper and pulp production. The breakdown and removal of the lignin from the lignocellulose are accomplished substantially by two methods, namely the sulfate process, also called kraft process, and the sulfite process. Degradation and removal of the lignin by the sulfate process take place at an elevated temperature (approximately 170° C.) by reaction of the lignocellulose (in the wood or other cellulosic plants) with alkali metal sulfides in a strongly alkaline medium, with sodium sulfide and sodium hydroxide solution being used more particularly. Following removal of the cellulose, the waste liquor from the sulfate process contains in its solid substances, when using coniferous woods, around 45% by weight of what is called kraft lignin, and about 38% by weight when using deciduous woods. In the case of the sulfite process, breakdown and removal of the lignin are accomplished by reacting the lignocellulose with sulfurous acid, followed by neutralization with a base, forming a reaction product which is not precisely defined in chemical terms, referred to as lignosulfonate. After the cellulose has been removed, the waste liquor from the sulfite process contains in terms of its solid substance about 55% by weight of lignosulfonate when using coniferous woods, and about 42% by weight when using deciduous woods.

As lignin compounds L of the present invention it is possible to use all lignin compounds, lignin reaction products and/or lignin breakdown products which at 20° C. and 1 atm (1.013 bar absolute) have a solubility ≥10 g, advantageously ≥50 g and with more particular advantage ≥100 g per 100 g of deionized water. In accordance with the invention, however, those embodiments are also included whose lignin compound L has a solubility <10 g per 100 g of deionized water at 20° C. and 1 atm. Depending on the amount of these lignin compounds L that are used, they may then also be present in the form of their aqueous suspension. Where lignin compounds L are used in accordance with the invention in a nature and amount such that they are present in aqueous suspension, it is advantageous if the lignin compound L particles suspended in aqueous medium have an average particle diameter ≤5 μm, preferably ≤3 μm and with more particular preference ≤1 μm. In the case of the aqueous polymer P dispersions, the average particle diameter is determined by the quasi-elastic light scattering method (ISO standard 13 321). More particular preference, however, is given to using lignin compounds L which have a solubility ≥10 g per 100 g of deionized water at 20° C. and 1 atm (1.013 bar absolute).

In accordance with the invention it is advantageous to use kraft lignins and lignosulfonates, with lignosulfonates being especially preferred. Although all of the salts of lignosulfonic acid can be used for the purposes of the invention, preference is given to using calcium lignosulfonate (CAS No. 8061-52-7), sodium lignosulfonate (CAS No. 8061-51-6), magnesium lignosulfonate (CAS No. 8061-54-9) and/or ammonium lignosulfonate (CAS No. 8061-53-8). Particularly preferred are sodium and calcium lignosulfonate, with sodium lignosulfonate being especially preferred. These compounds may be obtained for example commercially under the names BORREMENT® CA 120, BORRESPERSE® NA 200 or BORRESPERSE® NA 220 from BORREGAARD DEUTSCHLAND GmbH, or StarLig® Na 2420 from LignoStar Deutschland GmbH. It is advantageous to use lignosulfonates which have been obtained from so-called soft wood. By soft woods are meant those timbers which have a dried density <0.55 g/cm$^3$ (density of wood at 0% wood moisture content [DIN 52183]), such as more particularly the woods of the fast-growing willows, poplars, limes, and also the woods of coniferous trees, such as more particularly pines, firs, douglas firs, larches and spruces. Particular advantage attaches to using lignosulfonates which have been obtained from coniferous woods.

It is essential for the present invention that the total amount of lignin compound L can be added to the aqueous polymerization medium before or during the emulsion polymerization of monomers A to C or to the aqueous polymer P dispersion on completing the emulsion polymerization. As will be appreciated, it is also possible to add merely a portion of lignin compound L to the aqueous polymerization medium before or during the emulsion polymerization of monomers A to C and the remainder to the aqueous dispersion of polymer P on completing the emulsion polymerization. When all or some of the lignin compound L is added before or during the emulsion polymerization of monomers A to C, the quantity added can generally perform the protective colloid function, making it possible to reduce the amount of other protective colloids and/or emulsifiers and/or optionally to entirely dispense with them.

In one embodiment which is preferred in accordance with the invention, the overall amount of lignin compound L is added, after the emulsion polymerization of the monomers A to C, to the aqueous polymer P dispersion. Correspondingly, the invention also embraces a process wherein the overall amount of the lignin compound L is added to the aqueous dispersion of the polymer P.

In accordance with the invention the amount of lignin compound L is ≥10 and ≤60 parts by weight, advantageously ≥15 and ≤50 parts by weight and with more particular advantage ≥20 and ≤45 parts by weight per 100 parts by weight of polymer P (corresponding to the overall amount of monomers A to C used for the polymerization).

It is essential that the aqueous binder composition of the present invention, in addition to polymer P and lignin compound L, may additionally comprise still further components familiar to a person skilled in the art in terms of type and quantity, examples being thickeners, pigment dispersers, dispersants, emulsifiers, buffers, neutralizers, biocides, defoamers, polyol compounds having at least 2 hydroxyl groups and having a molecular weight ≤200 g/mol, film formation auxiliaries, organic solvents, pigments or fillers etc.

Advantageously, however, the aqueous binder composition comprises ≤1 wt %, more advantageously ≤0.5 wt % of a polyol compound having at least 2 hydroxyl groups and having a molecular weight ≤200 g/mol, especially ≤150 g/mol, for example ethylene glycol, 1,2-propanediol, 1,3-propanediol, 1,2,3-propanetriol, 1,2-butanediol, 1,4-butanediol, 1,2,3,4-butanetetrol, diethanolamine, triethanolamine, etc., based on the summed overall amounts of polymer P and lignin compound L.

It is also important that the present aqueous binder composition can comprise defatted soy flour with a mesh size of ≤43 μm in amounts, however, which are at least 20 wt % below the amounts disclosed in EP-A 2199320, paragraph [0035]. With particular advantage, however, the binder composition according to the present invention contains no such defatted soy flour whatsoever.

The aqueous binder composition of the present invention is advantageously suitable for use as binder for granular and/or fibrous substrates. Therefore, the aqueous binder compositions mentioned can be used with advantage in the production of shaped articles from granular and/or fibrous substrates. The binder compositions of the present invention are further useful as binders in noncementitious coatings, for example flexible coatings for roofs, wet room coatings or mortar compositions, sealants, for example joint sealants and adhesives, for example assembly adhesives, tile adhesives, contact adhesives or floor covering adhesives.

Granular and/or fibrous substrates are familiar to a person skilled in the art. They are for example wood chips, wood fibers, cellulose fibers, textile fibers, polymeric fibers, glass fibers, mineral fibers or natural fibers such as jute, flax, hemp or sisal, but also cork chips or sand and also other organic or inorganic natural and/or synthetic granular and/or fibrous compounds whose longest dimension is ≤10 mm, preferably ≤5 mm and especially ≤2 mm in the case of granular substrates. As will be appreciated, the term substrate shall also comprehend the webs obtainable from fibers, for example so-called mechanically consolidated, for example needled or chemically prebonded fiber webs. It is especially advantageous that the aqueous binder composition of the present invention is useful as formaldehyde-free or reduced-formaldehyde binder system for the aforementioned fibers and mechanically consolidated or chemically prebonded fiber webs.

The process for producing a shaped article from a granular and/or fibrous substrate and the aforementioned aqueous binder composition advantageously comprises applying the aqueous binder composition of the present invention to a granular and/or fibrous substrate (by impregnation), optionally shaping the granular and/or fibrous substrate treated (impregnated) with the aqueous binder composition and then subjecting the impregnated granular and/or fibrous substrate to a thermal treatment step at a temperature ≥110° C., advantageously ≥130° C. and more advantageously ≥150° C., wherein the binder composition undergoes filming and curing.

It is essential that the essential components of the aqueous binder composition, i.e., the aqueous dispersion of polymer P and the lignin compound L, especially in the form of its solution or suspension, can be mixed homogeneously before the applying to the granular and/or fibrous substrate. But it is also possible to mix these two components only immediately before the applying, for example using a static and/or dynamic mixing device. It is self-evidently also possible first to apply the aqueous dispersion of polymer P and then the aqueous solution or suspension of lignin compound L to the granular and/or fibrous substrate, in which case the mixing takes place on the granular and/or fibrous substrate. Similarly, however, it is also possible first to apply the aqueous solution or suspension of the lignin compound L and then the aqueous dispersion of polymer P to the granular and/or fibrous substrate. It will be appreciated that hybrid forms of applying the two essential components should also be comprehended according to the present invention.

Impregnating the granular and/or fibrous substrate generally takes the form of the aqueous binder composition being applied uniformly to the surface of the fibrous and/or granular substrate. The amount of aqueous binder composition is chosen such that, per 100 g of granular and/or fibrous substrate, ≥1 g and ≤100 g, preferably ≥2 g and ≤50 g and more preferably ≥5 g and ≤30 g of binder (reckoned as summed overall amounts of polymer P and lignin compound L on solids basis) are used. The actual method of impregnating the granular and/or fibrous substrate is familiar to a person skilled in the art and is effected by drenching or spraying the granular and/or fibrous substrate for example.

After impregnation, the granular and/or fibrous substrate is optionally formed into the desired shape, for example by introduction into a heatable press or mold. Thereafter, the shaped impregnated granular and/or fibrous substrate is dried and cured in a manner familiar to a person skilled in the art.

Drying and/or curing of the optionally shaped impregnated granular and/or fibrous substrate frequently takes place in two temperature stages, with the drying stage being carried out at a temperature <100° C., preferably ≥20° C. and ≤90° C. and more preferably ≥40 and ≤80° C. and the curing stage at a temperature ≥110° C., preferably ≥130 and ≤150° C. and more preferably ≥180° C. and ≤220° C.

However, it is self-evidently also possible for the drying stage and the curing stage of the shaped articles to take place in one operation, for example in a molding press.

The shaped articles obtainable by the process of the present invention have advantageous properties, more particularly an improved breaking strength and also improved heat resistance compared with the prior art shaped articles. Accordingly, the invention also embraces the shaped articles obtainable by the aforementioned process.

The aqueous binder composition of the present invention is therefore particularly advantageous for production of fiber webs based on polyester and/or glass fiber, which in turn are particularly useful for production of bituminized roofing membranes.

The actual method of producing bituminized roofing membranes is familiar to a person skilled in the art and is more particularly effected by application of liquefied optionally modified bitumen to one and/or both of the sides of a polyester and/or glass fiber web bonded with a binder composition of the present invention. Accordingly, the invention also embraces the aforementioned bituminized roofing membranes.

The examples which follow illustrate the invention and are nonlimiting.

EXAMPLES

I Preparation of Polymers P as their Aqueous Dispersions

Inventive Polymer Dispersion 1 (P1)

In a 2 l glass flask fitted with a stirrer and 4 metering devices, 429 g of deionized water and 19.5 g of a 33 wt % aqueous polystyrene seed dispersion (average particle diameter 32 nm) were initially charged at 20 to 25° C. (room temperature) and under nitrogen and heated to 90° C. under agitation. This was followed by the metered addition, commenced at the same time, of feed 1 in the form of an aqueous emulsion over a period of 3.5 hours and feed 2 in the form of an aqueous solution over a period of 4 hours, in a continuous manner at constant flow rates while maintaining the aforementioned temperature.

Feed 1:

| | |
|---|---|
| 17.0 g | of acrylic acid |
| 85.0 g | of acrylonitrile |
| 392 g | of styrene |
| 281 g | of n-butyl acrylate |
| 73.0 g | of a 35 wt % aqueous solution of N-methylolacrylamide |
| 17.8 g | of a 45 wt % aqueous solution of an alkylarylsulfonic acid mixture (Dowfax ® 2A1) |
| 192 g | of deionized water |

Feed 2:

| | |
|---|---|
| 85.0 g | of deionized water |
| 6.4 g | of sodium persulfate |

The polymerization mixture was subsequently allowed to undergo secondary polymerization at 90° C. for 30 minutes and cooled down to room temperature. A pH value of 7.0 was set by addition of 25 wt % aqueous sodium hydroxide solution. The aqueous polymer dispersion obtained had a solids content of 49.4 wt % based on the total weight of the aqueous dispersion. The number average particle diameter was determined as 202 nm. The glass transition temperature of a polymer formed exclusively from the monomers C is calculated by the Fox equation as 33° C.; the glass transition temperatures used were those specified in Ullmann's Encyclopedia of Industrial Chemistry (1992), Vol. A21, page 169, as follows for n-butyl acrylate: 230 K (−43° C.), styrene: 380 K (107° C.), and acrylonitrile: 378 K (105° C.).

Solids contents were generally determined by drying a defined amount of the aqueous polymer dispersion (about 0.8 g) using the HR73 moisture determinator from Mettler Toledo at a temperature of 130° C. to constant weight (about 2 hours). Two measurements were carried out in each case. The value reported in each case is the average value of these measurements.

Number average particle diameters for the polymer particles were generally determined by dynamic light scattering on a 0.005 to 0.01 weight percent aqueous polymer dispersion at 23° C. using an Autosizer IIC from Malvern Instruments, England. The reported value is the cumulant z average of the measured autocorrelation function (ISO standard 13321).

The glass transition temperatures were generally determined by the DSC method (Differential Scanning calorimetry, 20 k/min, midpoint measurement, DIN 53 765).

Inventive Polymer Dispersion 2 (P2)

The preparation of P1 was repeated except that feed 1 used 239 g instead of 192 g of deionized water and 25.6 g of glycidyl acrylate instead of 73 g of a 35 wt % aqueous solution of N-methylolacrylamide.

The aqueous polymer dispersion obtained had a solids content of 49.7% by weight based on the total weight of the aqueous dispersion. The number average particle diameter was determined as 171 nm.

Inventive Polymer Dispersion 3 (P3)

The preparation of P2 was repeated except that feed 1 used 25.6 g of 2-hydroxyethyl acrylate instead of 25.6 g of glycidyl acrylate.

The aqueous polymer dispersion obtained had a solids content of 49.6% by weight based on the total weight of the aqueous dispersion. The number average particle diameter was determined as 194 nm.

Inventive Polymer Dispersion 4 (P4)

The preparation of P2 was repeated except that feed 1 used 25.6 g of 3-methacryloyloxypropyl-trimethylsilane instead of 25.6 g of glycidyl acrylate.

The aqueous polymer dispersion obtained had a solids content of 49.9% by weight based on the total weight of the aqueous dispersion. The number average particle diameter was determined as 187 nm.

Inventive Polymer Dispersion 5 (P5)

The preparation of P2 was repeated except that feed 1 used 8.6 g of allyl methacrylate instead of 25.6 g of glycidyl acrylate and also 400 g instead of 392 of styrene and 290 g instead of 281 of n-butyl acrylate.

The aqueous polymer dispersion obtained had a solids content of 49.4% by weight based on the total weight of the aqueous dispersion. The number average particle diameter was determined as 179 nm.

Inventive Polymer Dispersion 6 (P6)

The preparation of P2 was repeated except that feed 1 used 25.6 g of diacetoneacrylamide instead of 25.6 g of glycidyl acrylate.

The aqueous polymer dispersion obtained had a solids content of 49.8% by weight based on the total weight of the aqueous dispersion. The number average particle diameter was determined as 189 nm.

Comparative Polymer Dispersion 1 (C1)

The preparation of P1 was repeated except that feed 1 used 265 g instead of 192 g of deionized water, and no 35 wt % aqueous solution of N-methylolacrylamide was used.

The aqueous polymer dispersion obtained had a solids content of 49.0% by weight based on the total weight of the aqueous dispersion. The number average particle diameter was determined as 185 nm.

Comparative Polymer Dispersion 2 (C2)

The preparation of P1 was repeated except that feed 1 used 170 g instead of 281 g of n-butyl acrylate and 503 g instead of 392 g of styrene.

The aqueous polymer dispersion obtained had a solids content of 49.4% by weight based on the total weight of the aqueous dispersion. The number average particle diameter was determined as 175 nm. The glass transition temperature of a polymer formed exclusively from the monomers C is calculated by the Fox equation to be 58° C.

II Preparation of Bonded Fiber Webs and Use Experiments

Bonded fiber webs were produced using as raw web a needled polyethylene terephthalate spunbonded web (40 cm length, 37 cm width) having a density of 125 g/m$^2$ from Freudenberg-Politex.

The impregnating liquors were produced by first diluting the aqueous polymer dispersions P1 to P6 and also C1 and C2 with deionized water to a solids content of 49 wt %. Subsequently, 160 parts by weight of each of the resultant aqueous polymer dispersions P1 to P6 and also C1 and C2 were admixed at room temperature with 40 parts by weight of an aqueous solution of Na lignosulfonate (StarLig® Na 2420 from LignoStar Deutschland GmbH) with a solids content of 50% by weight, and the components were mixed homogeneously. The resulting mixtures were then diluted, with homogeneous mixing, to a solids content of 15% by weight with deionized water, and were identified as impregnating liquors IL1 to IL6 and also ILC1 and ILC2. Additionally, the aqueous polymer dispersion P1, without addition of lignosulfonate solution, was diluted with deionized water to a solids content of 15 wt %. The dilute aqueous polymer dispersion obtained is identified as impregnating liquor ILC3. Furthermore, the aqueous polymer dispersion P1 was mixed with a commercial 70 wt % strength aqueous solution of a self-crosslinking melamine-formaldehyde resin (Saduren® 163 from BASF SE) such that the solids weight ratio of the aqueous polymer dispersion P1 to the aqueous melamine-formaldehyde resin solution was 80:20. After that, deionized water was added to give a solids content of 15 wt %. The resulting dilute aqueous solution is identified as impregnating liquor ILC4.

The bonded fiber webs were produced by saturating the raw webs with the respective impregnating liquors IL1 to IL6 and also ILC1 to ILC4 in the longitudinal direction in an HVF impregnating rig with pad-mangle from Mathis (rubber roll Shore A=85°/steel roll). In each case, the wet pick-up was adjusted to 197 g of impregnating liquor per square meter (corresponding to a solids content of 29.6 g/m$^2$). The impregnated fiber webs obtained were subsequently dried and cured in an LTV laboratory dryer with needle frame from Mathis (in circulating air operation). To this end, the impregnated fiber webs were each placed on an open needle frame, fixed by folding shut and then cured in the laboratory dryer at 200° C. for 3 minutes. The bonded fiber webs obtained in the process are signified as fiber webs FW1 to FW6 and also FWC1 to FWC4, depending on the impregnating liquors used.

Determination of Breaking Strength in Transverse Direction

Breaking strength in transverse direction was determined for fiber webs FW1 to FW6 and also FWC1 to FWC4 at room temperature in accordance with DIN 52123 using a breaking machine from Frank (model 71565). In each case, 5 separate measurements were carried out. The measurements in N/50 mm which are reported in table 1 represent the respective averages of these measurements. The higher the measurements obtained, the better the breaking strength in the transverse direction.

Determination of Heat Resistance

The heat resistance of fiber webs FW1 to FW6 and also FWC1 to FWC4 was determined by extension measurements using a breaking machine from Zwick (model Z10) with integrated heating chamber. To this end, 50×210 mm strips were die-cut out of fiber webs FW1 to FW6 and also FWC1 to FWC4 in the longitudinal direction and clamped with a length of 100 mm into the pulling device. After introduction to the heating chamber, the test strips were each heated at 180° C. for 60 minutes and thereafter extended at this temperature with increasing tensile force at a pullaway rate of 150 mm/min. The extension of the test strips in percent was determined on reaching a tensile force of 40 N/50 mm. The lower the extension obtained, the better the heat resistance. In each case, 5 separate measurements were carried out. The values likewise reported in table represent the averages of these measurements.

TABLE 1

Results for breaking strength in transverse direction and heat resistance of fiber webs FW1 to FW6 and FWC1 to FWC4

| Fiber web | Transverse breaking strength at room temperature [in N/50 mm] | Extension at 40 N/50 mm and 180° C. [in %] |
|---|---|---|
| FW1 | 332 | 2.9 |
| FW2 | 324 | 3.0 |
| FW3 | 312 | 3.2 |
| FW4 | 317 | 3.1 |
| FW5 | 321 | 3.0 |
| FW6 | 314 | 3.2 |
| FWC1 | 294 | 3.7 |
| FWC2 | 298 | 3.8 |
| FWC3 | 301 | 3.6 |
| FWC4 | 311 | 3.0 |

It is clearly apparent from the results that the fiber webs produced with the inventive binder compositions have improved transverse breaking strength at room temperature and/or lower extension at 180° C.

The invention claimed is:

1. An aqueous binder composition, comprising:
    a) at least one polymer P constructed from
        ≥0.1 and ≤10 wt % of monomer A of at least one monoethylenically unsaturated compound having at least one silicon-containing group, an epoxy, hydroxyalkyl, N-methylol or carbonyl group, and/or of at least one compound which has at least two nonconjugated ethylenically unsaturated groups;
        ≤0 and <5 wt % of monomer B of at least one monoethylenically unsaturated $C_3$ to $C_6$ monocarboxylic and/or $C_4$-$C_6$-dicarboxylic acid and also the salts and anhydrides thereof; and
        >85 and ≤99.9 wt % of monomer C of further ethylenically unsaturated compounds, different from the monomers A and B, the nature and amount of these ethylenically unsaturated compounds being selected such that a polymer constructed solely from them in polymerized form would have a glass transition temperature in the range ≥10 and ≤50° C.,
        in polymerized form, wherein a sum of the amounts of monomer A, B and C is 100 wt %; and
    b) at least one lignin compound L, the amount of which is determined such that it is ≥10 and ≤60 parts by weight per 100 parts by weight of the polymer P.

2. The aqueous binder composition according to claim 1, wherein monomer A is at least one monomer selected from the group consisting of N-methylolacrylamide, N-methylolmethacrylamide, glycidyl acrylate, glycidyl methacrylate, 2-hydroxyethyl acrylate, 2-hydroxyethyl methacrylate, 1,4-butylene glycol diacrylate, allyl methacrylate and divinylbenzene.

3. The aqueous binder composition according to claim 1, wherein the monomer C is at least one monomer selected from the group consisting of conjugated aliphatic C4 to C9 dienes, esters of vinyl alcohol and a C1 to C10 monocarboxylic acid, C 1 to C10 alkyl acrylates, C1 to C10 alkyl methacrylates, ethylenically unsaturated C3 to C6 monocarbonitriles, ethylenically unsaturated C4 to C6 dicarbonitriles, C5 to C10 cycloalkyl acrylates and methacrylates, C1 to C10 dialkyl maleates and C1 to C 10 dialkyl fumarates and vinylaromatic monomers.

4. The aqueous binder composition according to claim 1, wherein the polymer P is in a form of an aqueous polymer dispersion.

5. The aqueous binder composition according to claim 4, wherein polymer particles of the aqueous polymer dispersion have a number average particle diameter of ≥50 and ≤250 nm.

6. The aqueous binder composition according to claim 1, wherein the polymer P is constructed from
    ≥0.1 and ≤5 wt % of monomer A;
    ≥0.1 and ≤4 wt % of monomer B; and
    ≥91 and ≤99.8 wt % of monomer C.

7. The aqueous binder composition according to claim 1, wherein the polymer P is constructed from
    ≥0.5 and ≤3 wt % of N-methylolacrylamide, N-methylolmethacrylamide, glycidyl acrylate, glycidyl methacrylate, 2-hydroxyethyl acrylate, 2-hydroxyethyl methacrylate, 1,4-butylene glycol diacrylate, allyl methacrylate and/or divinylbenzene;
    ≥0.1 and ≤3 wt % of acrylic acid, methacrylic acid, maleic acid, maleic anhydride and/or itaconic acid; and
    ≥94 and ≤99.4 wt % of 2-ethylhexyl acrylate, n-butyl acrylate, acrylonitrile, 1,4-butadiene, ethyl acrylate, vinyl acetate, methyl methacrylate, styrene and/or tert-butyl methacrylate.

8. The aqueous binder composition according to claim 1, wherein the lignin compound L is a lignosulfonate.

9. The aqueous binder composition according to claim 8, wherein the lignosulfonate is obtained from coniferous wood.

10. The aqueous binder composition according to claim 1, wherein ≥20 and ≤45 parts by weight of the lignin compound L are used per 100 parts by weight of the polymer P.

11. A process for preparing the aqueous binder composition according to claim 4, the process comprising:
    adding an overall amount of the lignin compound L to the aqueous polymer dispersion of the polymer P.

12. A binder, comprising:
    the aqueous binder composition according to claim 1.

13. A process for producing a shaped article from granular and/or fibrous substrates, the process comprising:
    applying the aqueous binder composition according to claim 1 to the granular and/or fibrous substrate,
    optionally shaping the granular and/or fibrous substrate and
    subjecting the granular and/or fibrous substrate to a thermal treatment at a temperature of ≥110° C.

14. The process according to claim 13,
    wherein an amount of the aqueous binder composition is chosen such that ≥1 and ≤100 g of the aqueous binder composition, corresponding to a sum of the polymer P and the lignin compound L, are applied per 100 g of the granular and/or fibrous substrate.

15. A shaped article obtained by the process according to claim 13.

16. A method for producing a bituminized roofing membrane, the method comprising:
  producing the bituminized roofing membrane with the shaped article according to claim 15.

17. A bituminized roofing membrane obtained with the shaped article according to claim 15.

* * * * *